United States Patent
Dumontier

[15] 3,692,345
[45] Sept. 19, 1972

[54] COMPOSITE BUMPERS

[72] Inventor: Jean-Michel Dumontier, Billancourt, France

[73] Assignees: Regie Nationale Des Usines Renault, Billancourt, Germany; Automobile Peugeot, Paris, France

[22] Filed: April 5, 1971

[21] Appl. No.: 131,034

[30] Foreign Application Priority Data

April 30, 1970 France.....................7015924

[52] U.S. Cl......................293/71 R, 293/70, 293/99
[51] Int. Cl.............................................B60r 19/08
[58] Field of Search..........293/60, 63, 64, 70, 71, 80, 293/87, 88, 98, 99

[56] References Cited

UNITED STATES PATENTS

| | | | |
|---|---|---|---|
| 955,624 | 4/1910 | Welton | 293/71 R |
| 1,669,936 | 5/1928 | Hawkes et al. | 293/62 |
| 1,666,754 | 4/1928 | Rahe | 293/87 |

Primary Examiner—Gerald M. Forlenza
Assistant Examiner—Robert Saifer
Attorney—Stevens, Davis, Miller & Mosher

[57] ABSTRACT

This automotive bumper is a composite structure comprising a shield of synthetic material and a rigid reinforcing member having a S-shaped cross-sectional contour, disposed between the front portion of the shield and the plane of the front cross member of the vehicle chassis, said rigid member extending substantially throughout the width of said front portion, this bumper further comprising a pair of side flanges connecting in overhanging relationship the lower loop of said reinforcing member to said chassis cross member, said flanges being vertically and rigidly connected to one face of said cross member so that in case of shock said flanges are sheared about an axis substantially parallel to said chassis cross member.

4 Claims, 3 Drawing Figures

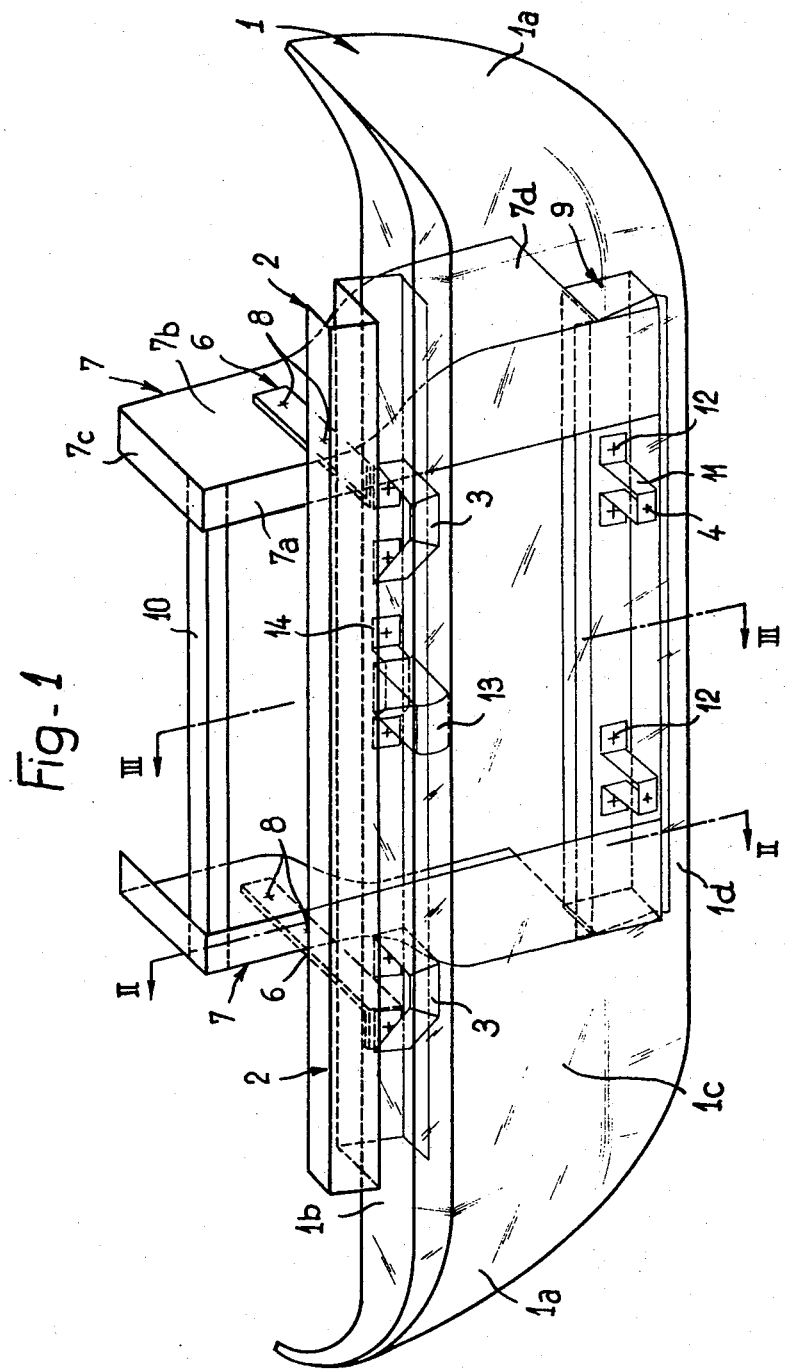

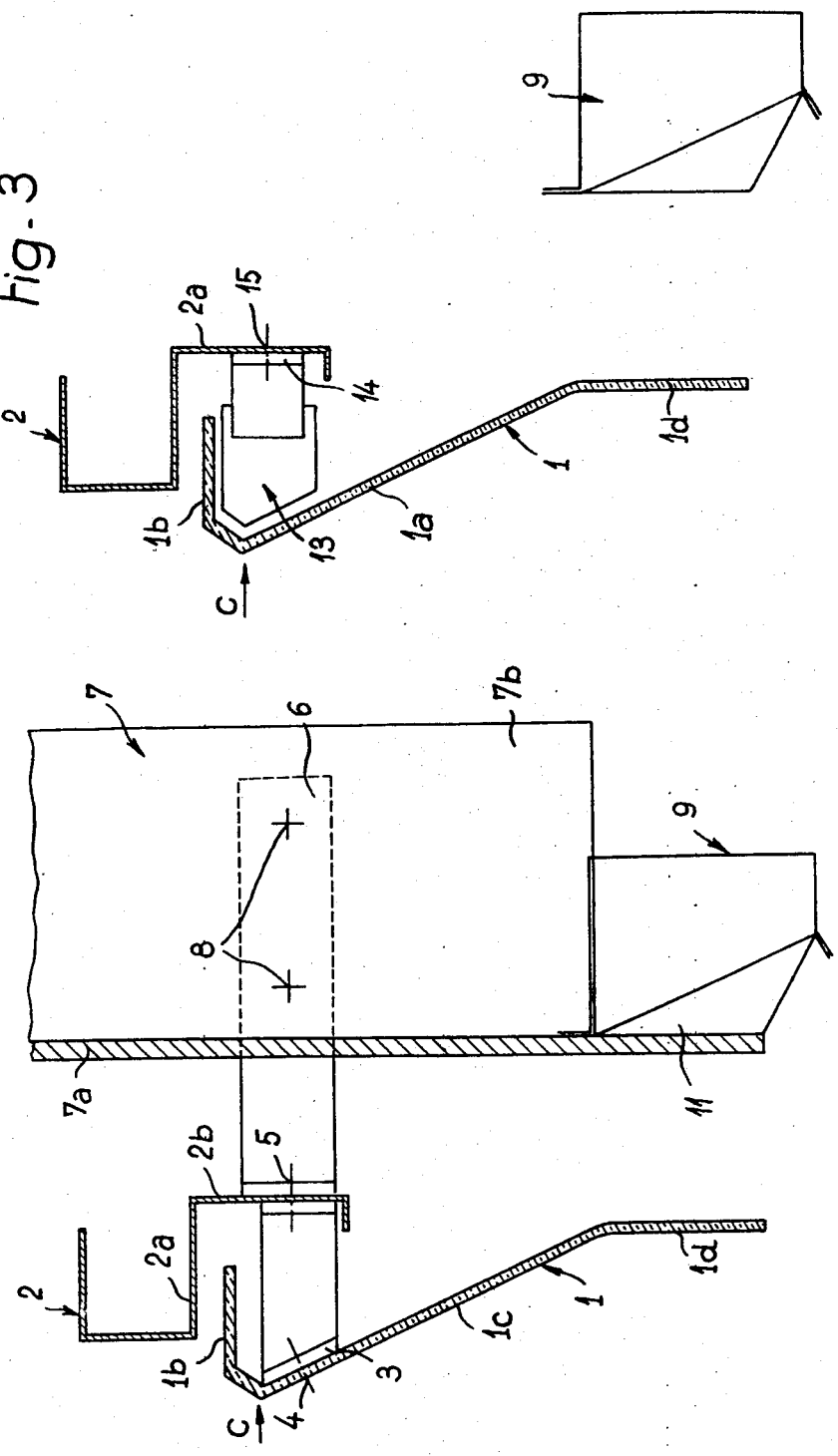

COMPOSITE BUMPERS

The present invention relates to bumpers of automotive vehicles in general and has specific reference to a composite bumper structure of the shield type and also to the method of fastening same, this bumper comprising an element of synthetic material and another, rigid reinforcing element.

Bumpers comprising a shield of synthetic material are already known ; one of their chief advantage in comparison with conventional metal bumpers resides in the fact that up to a certain force in case of front crash or shock the absorption of energy is attended by a reversible elastic distortion of the material.

On the other hand, the flexibility of this material is attended by a substantial inconvenience, notably in the case of shield bumpers mounted on vehicles having a relatively wide track, since a distortion of the synthetic material as a consequence of a shock of relatively great force permits the penetration of the hitting body into a cavity possibly present on vehicle, with the consequent destruction of the members enclosed in said cavity.

It is the essential object of the present invention to provide a shield-type bumper of synthetic material, possibly reinforced with glass fibers and having a rigid reinforcing rear portion or member, in order to avoid the inconvenience set forth hereinabove, the bumper according to this invention being further characterized by the following advantageous features :

efficient absorption of relatively strong shocks over a considerable surface area, without producing any permanent deformation ;

in case of stronger shocks, simultaneous absorption with assistance of an additional device while avoiding, up to a limit value, the excessive distortion of the shield ;

more conventional aesthetic appearance, improved on account of the fact that a bright portion of the complementary device remains visible.

improved streamlining and reduced weight of the protection assembly.

This bumper is characterized essentially in that the rigid reinforcing member is substantially S-shaped in cross section with only its inner loop likely to contact the upper portion of the shield of synthetic material, said reinforcing element being disposed between the front portion of the shield and the vertical plane of the transverse portion or front cross member of the chassis of the vehicle, and extending through substantially the entire width of said front portion, this bumper further comprising a pair of side webs connecting in overhanging relationship the lower loop of said reinforcing element to said cross member of the chassis, said side webs being assembled vertically to one face of said cross member so that in case of shock these webs are sheared about an axis substantially parallel to said chassis cross member.

Other features and advantages characterizing this invention will appear as the following description proceeds with reference to the accompanying drawings illustrating diagrammatically by way of example a typical form of embodiment of a front bumper. In the drawings :

FIG. 1 is a perspective front view showing the shield with its reinforcing structure and the fittings thereof ;

FIG. 2 is a section taken along the vertical plan II—II of FIG. 1, and

FIG. 3 is another vertical section taken along the plane III—III of FIG. 1,

Referring first to FIG. 1, this composite bumper structure comprises essentially a shield 1 adapted to protect the front of the vehicle and a cross member 2 constituting the reinforcing element and at the same time the fitting for fastening the shield to the vehicle.

The shield 1 having curved side ends consists of a high-density synthetic material possibly reinforced by glass fibers and obtained from miscellaneous materials such as P.V.C., propylene, polyethylene, or copolymers of the ABS type. A product sold under the Tradename STRATIREX may also be used to advantage for making this shield. The shield may be manufactured by moulding or shaping (extrusion moulding).

As illustrated in FIGS. 1 and 2, this shield comprises a relatively high front central portion (about 12 inches high) and on either side a rounded lateral portion 1a directed towards the front wheels of the vehicle ; furthermore, it comprises a horizontally inswept upper portion 1b, a protection portion 1c inclined backwards to an angle of about 30° to the vertical (towards the front wheels of the vehicle) and a lower vertical portion 1d. With this shape the aerodynamic penetration in air at high speed is much improved in that the air streams are channelled along the body, thus giving a very favorable drag factor.

The bumper cross member or reinforcing element 2 having a length corresponding substantially to that of the front portion of said shield 1 has a S-shaped cross-section and the top of its upper loop 2a is substantially flush with the upper horizontal face of the shield ; thus, this loop is visible to an abserver placed in front of the vehicle. This element may thus be partially or entirely chromium-plated to emphasize the shield contour and thus restore a more conventional appearance of the vehicle by attenuating the usually stern appearance of the synthetic material constituting said shield.

A pair of bridge-shaped fittings 3 relatively spaced from each other and secured to the shield by means of screws 4 having their heads embedded in this shield by molding are provided for securing the top of the inclined portion 1b of shield 1 by means of screws or bolts 5 to the lower loop 2b of reinforcing member 2. In conjunction therewith, a pair of bent lugs 6 having their rear free ends each adapted to be secured by bolts 8 to a lateral flange 7 are secured to said reinforcing member 2.

Each flange 7 comprises a front plate 7a widening to the bottom and a side plate 7b having a double curvature and an upper horizontal strip 7c. The height of the side plate 7b is inferior to that of said front plate 7a, the two plates being assembled by welding. The lower portion of the front plate 7a of each flange 7 is welded to the front face of a cross member 9 of the chassis of the vehicle ; the arm 7d of side plate 7b is flush with the end of said chassis cross member 9. A section member 10 is provided for interconnecting the front ends of the upper strips 7c of side flanges 7.

The vertical portion 1c of shield 1 is also secured to the chassis cross member 9 by means of fittings lugs 11 secured on the one hand to the shield by means of screws 4 having their heads embedded by moulding in said shield and on the other hand to the chassis cross member 9 by means of bolts 12.

At least one elastomer pad 13 is secured to the lower loop 2b of reinforcing member 2 by means of a fitting 14 and bolts 15, as shown in FIGS. 1 and 3.

This pad provides a sufficient spacing between shield 1 and reinforcing member 2 and acts as a shock absorber between this member 2 and the upper portion of shield 1, so that in case of moderate shocks the shield 1 alone will undergo a minor elastic deformation.

In case of stronger impact the shield 1, after the bridge-shaped fittings 3 have been more or less flattened and one fraction of the impact energy has been absorbed by the resilient pad or pads 13, bears throughout its length against the rigid reinforcing member 2 which can be supported without any inconvenience by the speed fitting lugs 6.

In case of severe head-on crash a considerable amount of energy will be absorbed during the multiple deformations of all the bumper component elements.

In fact, the thrust C exerted against the upper foremost portion 1b of shield 1 at the level of reinforcing member 2 should overcome firstly the shield resistance, then the resistance of the reinforcing member proper which can yield transversely. If the shock is of considerable magnitude and due to the overhanging mounting, and also to the shape of the side flanges 7 supporting the structure 2, a torque is created which tends to shear these flanges about an axis substantially parallel to the chassis cross member 9, whereby the chassis and the passenger compartment supported thereby are the last elements to be deformed.

Of course, the above-described bumper may also be mounted to the back of the vehicle while undergoing but minor modifications and without departing from the basic principle of this invention.

What is claimed as new is:

1. A composite bumper of the shield type for vehicles having a chassis including a front cross member, which comprises an external shield of high-density synthetic material and a rigid reinforcing member, characterized in that said reinforcing member has an S-shaped cross-sectional configuration, only the lower loop of this S-shaped reinforcing member being adapted to engage the upper portion of the shield of synthetic material, said reinforcing member being disposed between the front portion of said shield and the plane of the front cross member of the chassis of the vehicle which extends substantially throughout the width of said front portion, said composite bumper further comprising a pair of side flanges connecting, in overhanging relationship, the lower loop of said reinforcing member to said chassis cross-member, said flanges being vertically rigid with one face of said cross member so that in case of shock said flanges are sheared about an axis substantially parallel to said chassis cross member.

2. Composite bumper according to claim 1, characterized in that at least one elastic pad acts as a distance-piece between the shield and the rigid reinforcing member in the inoperative condition of the assembly, so as to provide a sufficient gap between these two main component elements of the bumper whereby, in case of moderate shocks, only the shield undergoes an elastic deformation.

3. Composite bumper according to claim 1, characterized in that each side flange consists of a curved lateral plate and of a vertical front plate, said front plate alone being rigidly attached to the chassis cross member, said lateral plate being attached to said reinforcing member.

4. Composite bumper according to claim 1, characterized in that the upper loop of said S-sectioned rigid reinforcing member is provided at least partly with a coating layer adapted to improve its appearance and emphasize in a more aesthetic manner the upper contour of the shield.

* * * * *